US009675207B2

United States Patent
Atalay et al.

(10) Patent No.: US 9,675,207 B2
(45) Date of Patent: Jun. 13, 2017

(54) AUTOMATIC DONER KEBAB SLICING MACHINE

(71) Applicants: Oğuz Atalay, Tekirdag (TR); Yakup Altun, Tekirdag (TR); Uğur Atalay, Tekirdag (TR)

(72) Inventors: Oğuz Atalay, Tekirdag (TR); Yakup Altun, Tekirdag (TR); Uğur Atalay, Tekirdag (TR)

(*) Notice: Subject to any disclaimer, the term of this patent is extended or adjusted under 35 U.S.C. 154(b) by 317 days.

(21) Appl. No.: 14/388,590

(22) PCT Filed: Apr. 19, 2013

(86) PCT No.: PCT/TR2013/000124
§ 371 (c)(1),
(2) Date: Sep. 26, 2014

(87) PCT Pub. No.: WO2013/158056
PCT Pub. Date: Oct. 24, 2013

(65) Prior Publication Data
US 2015/0135971 A1 May 21, 2015

(30) Foreign Application Priority Data
Apr. 19, 2012 (TR) .................. 2012/04592

(51) Int. Cl.
A47J 37/04 (2006.01)
B26D 3/11 (2006.01)
B26D 1/16 (2006.01)

(52) U.S. Cl.
CPC .............. *A47J 37/043* (2013.01); *A47J 37/04* (2013.01); *B26D 1/16* (2013.01); *B26D 3/11* (2013.01)

(58) Field of Classification Search
CPC .......... A47J 37/043; A47J 17/16; A47J 37/04; A23N 7/026; B26D 3/11
(Continued)

(56) References Cited

U.S. PATENT DOCUMENTS 4,300,443 A * 11/1981 Morcos ............... B26D 3/28
426/518
6,837,149 B1 * 1/2005 Tsontakis ............. A47J 37/046
99/339

FOREIGN PATENT DOCUMENTS

AU 2005222557 A1 12/2006
EP 2412283 * 2/2012 ............ A47J 37/043
(Continued)

OTHER PUBLICATIONS

International Search Report for corresponding International Application No. PCT/TR2013/000124.

*Primary Examiner* — Reginald L Alexander
(74) *Attorney, Agent, or Firm* — Egbert Law Offices, PLLC

(57) ABSTRACT

A doner kebab rotisserie enables the meat of chicken or doner kebab to be formed, cooked and sliced, and where the formed meats are positioned, a circular knife located in the cutting unit and enabling the doner kebab to be sliced by rotating, and a doner kebab burner including a burner wing used while cooking the kebab and providing heat for the desired area of doner kebab. Specifically, an automatic doner kebab slicing machine disclosed includes a doner kebab follow-up apparatus, the position of the upper section of which does not change when it performs rotating motion in accordance with the circular knife and which enables slicing of the doner kebab at fixed thickness and enables the angular change to be construed by an electronic system by transferring angular change to the bearing during the doner kebab surface follow-up via doner kebab follow-up apparatus bearing where it is positioned.

4 Claims, 3 Drawing Sheets

(58) Field of Classification Search
USPC ...... 99/421 V, 538, 593, 594, 596, 597, 598;
83/485, 487, 932
See application file for complete search history.

(56) References Cited

FOREIGN PATENT DOCUMENTS

| | | | | |
|---|---|---|---|---|
| FR | 2906990 | * | 4/2008 | ............ A47J 37/043 |
| GB | 2218327 | A | 11/1989 | |
| NL | 1013977 | C1 | 7/2001 | |
| WO | 9951135 | A1 | 10/1999 | |
| WO | 2006122342 | A1 | 11/2006 | |
| WO | 2009085022 | A1 | 7/2009 | |

* cited by examiner

AUTOMATIC DONER KEBAB SLICING MACHINE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention is related to automatic slicing machine that enables the products obtained by forming meat of chicken, veal etc. in a certain manner to be cooked and sliced automatically under the control of the user.

The present invention is especially related to automatic doner kebab slicing machine, which enables the processes such as cooking doner kebab obtained after forming the meat of chicken, veal etc. in the shape of doner kebab, in maximum diameter, height and slope as much as desired and slicing thereof in desired thickness, to be determined by the user and to be performed automatically.

2. Description of Related Art Including Information Disclosed Under 37 CFR 1.97 and 37 CFR 1.98.

Today, many mechanisms where doner kebab slicing processes are performed are present. These create some problems while detecting the doner kebab meat, and hence performing the slicing. One of them is gauge slicing process. In the gauge slicing process, where doner kebab meat is detected, a gauge is used in the maximum size of doner kebab that can be sliced by the product getting closer to the doner kebab with a cutting knife and when said gauge contacts with doner kebab, slicing is performed on gauge plane and along the gauge. Here, slicing height is not equal to the doner kebab height and additional displacement is performed. That kind of slicing is appropriate for cylindrical doner kebabs and if doner kebab put during the first slicing process is conical or has roughness thereon, it cannot be sliced until the entire doner kebab surface is cylindrical. The non-sliced surfaces will be burnt during the second cooking process. In addition, the apparatuses are difficult to be cleaned because of their complexity.

Optic system, which is another system performing doner kebab slicing process and detecting doner kebab meat, includes optic sensors at both sides of knife mechanism that will perform the doner kebab meat slicing process. The position of doner kebab meat to be put between the sensors is detected and surface follow-up process is performed. Conical doner kebab can be sliced in said system; however, meat pieces hanging out of doner kebab surface cause the surface of doner kebab to be rough, in other words, to have many burrs, or as the meats put on slicing blade are detected as doner kebab surface by optic detector, surface follow-up cannot be performed on said areas. Therefore, the non-sliced surfaces are burnt during the second cooking process.

One of the applications encountered in the search made in the literature with regards to the subject is the application numbered AU2008100850 and titled "meat slicing system". Said application is configured in order to slice the meat on a rotisserie around a longitudinal axis as gauge slicing process. Said meat slicing system comprises an arm. Said arm is mounted so as to rotate on a support and is positioned angular to the rotisserie. Said arm comprises a cutting end extending on a determined length and having a cutting track. Said cutting track extends longitudinal and parallel to the rotisserie and retains a cutting tool and allows the movement of cutting tool along the cutting track.

Another application relating to the subject is the one numbered WO2009085022 and titled "microcontroller controlled doner kebab meat broiler and cutter machine, operated by individual motion forms, with stepper motors and optical scanners". Said application is an optical system and is related to a machine recognizing the formed doner kebab. Said meat is cut by achieving different forms in terms of linear and angular position, speed, acceleration vector properties using optical detectors in determined periods.

In conclusion, improvements are made in doner kebab slicing systems and thus, new embodiments eliminating the above mentioned disadvantages and offering solutions for the present systems are needed.

OBJECT OF THE INVENTION

The present invention is related to automatic doner kebab slicing machine, which satisfies the above mentioned requirements, eliminates all the disadvantages and offers additional advantages, and enables the processes such as cooking doner kebab obtained after forming the meat of chicken, veal etc. in the shape of doner kebab, in maximum diameter, height and slope as much as desired and slicing thereof in desired thickness, to be determined by the user and to be performed automatically.

An object of the present invention is to introduce an automatic doner kebab slicing machine enabling each conic, flat and rough surface forms to be sliced.

Another object of the present invention is to enable the doner kebab slicing process to be performed only by moving as much as the length of doner kebab without performing unnecessary complete stroke motion.

Another object of the present invention is to minimize the angular motion on doner kebab thanks to the design of housing where doner kebab is located by being put on rotisserie. Therefore, this enables the sliced surfaces to be positioned in a correct manner when each vertical motion is completed and the next one is initiated during the slicing of doner kebab.

Another object of the present invention is to enable the rotisserie to rotate idly without being displaced thanks to the fact that the angular motion of the part provided on the housing is performed with a wrench when the rotisserie is in the housing. Thus, doner kebab is enabled to rotate idly for manual slicing in case of any breakdown or electricity cut.

Another object of the present invention is to eliminate the hits that may occur while locating the doner kebab into the housing together with the shaft and prevent the doner kebab and the mechanism from being damaged.

Another object of the present invention is to protect the connection point against negative effects such as smearing of doner kebab piece and steaming from the doner kebab surface by locating the mobile arm in the opposite direction of the location where the doner kebab is provided.

Another object of the present invention is to enable the vertical axis to function behind and extend the working area of the workers by providing the arm with an additional extension.

Another object of the present invention is to access to the desired amount of sliced doner kebab at any time thanks to mobile tray system.

A different object of the present invention is to enable the doner kebab burner to get closer to doner kebab, remain in desired position easily, and to adjust the angle thereof in accordance with the doner kebab surface.

BRIEF SUMMARY OF THE INVENTION

In order to achieve all the advantages mentioned above and to be understood from the detailed description below, the present invention is related to an automatic doner kebab slicing machine enabling the meat of chicken, doner kebab etc. be formed, cooked and sliced, and comprising doner kebab rotisserie where said formed meats are positioned, circular knife located in the cutting unit inside the arm unit and enabling the doner kebab to be sliced by rotating, and a doner kebab burner including burner wing used while cooking said doner kebab and providing heat for the desired area of doner kebab, characterized in that it comprises a doner kebab follow-up apparatus, the position of the upper section of which does not change when it performs rotating motion in accordance with said circular knife and which enables to slice doner kebab at fixed thickness and enables the angular change to be construed by electronic system by transferring angular change to the bearing during the doner kebab surface follow-up via doner kebab follow-up apparatus bearing (30) where it is positioned.

In order to achieve all the objects, the present invention comprises doner kebab rotisserie lower bearing where doner kebab rotisserie is located, and which enables the sliced surfaces to be positioned adjacently at the end of each vertical movement by minimizing the angular motion of said doner kebab rotisserie, and allows the doner kebab rotisserie to be rotated idly without being removed from the housing when desired.

The structural and characteristic features and all the advantages of the invention will be more clearly understood thanks to the figures below and the detailed description written with reference to those figures and therefore, the evaluation needs to be done by taking said figures and detailed description into consideration.

BRIEF DESCRIPTION OF THE DRAWINGS

In order for the embodiment and advantages of the present invention together with the additional members to be better understood, it is required to be evaluated together with the figures described below.

The drawings do not need to be scaled necessarily and the details that are not necessary to understand the present invention may have been ignored. In addition, the members that are identical to a great extent or have identical functions to a great extent are referred with the same numeral.

REFERENCE NUMERALS

Figure 1:
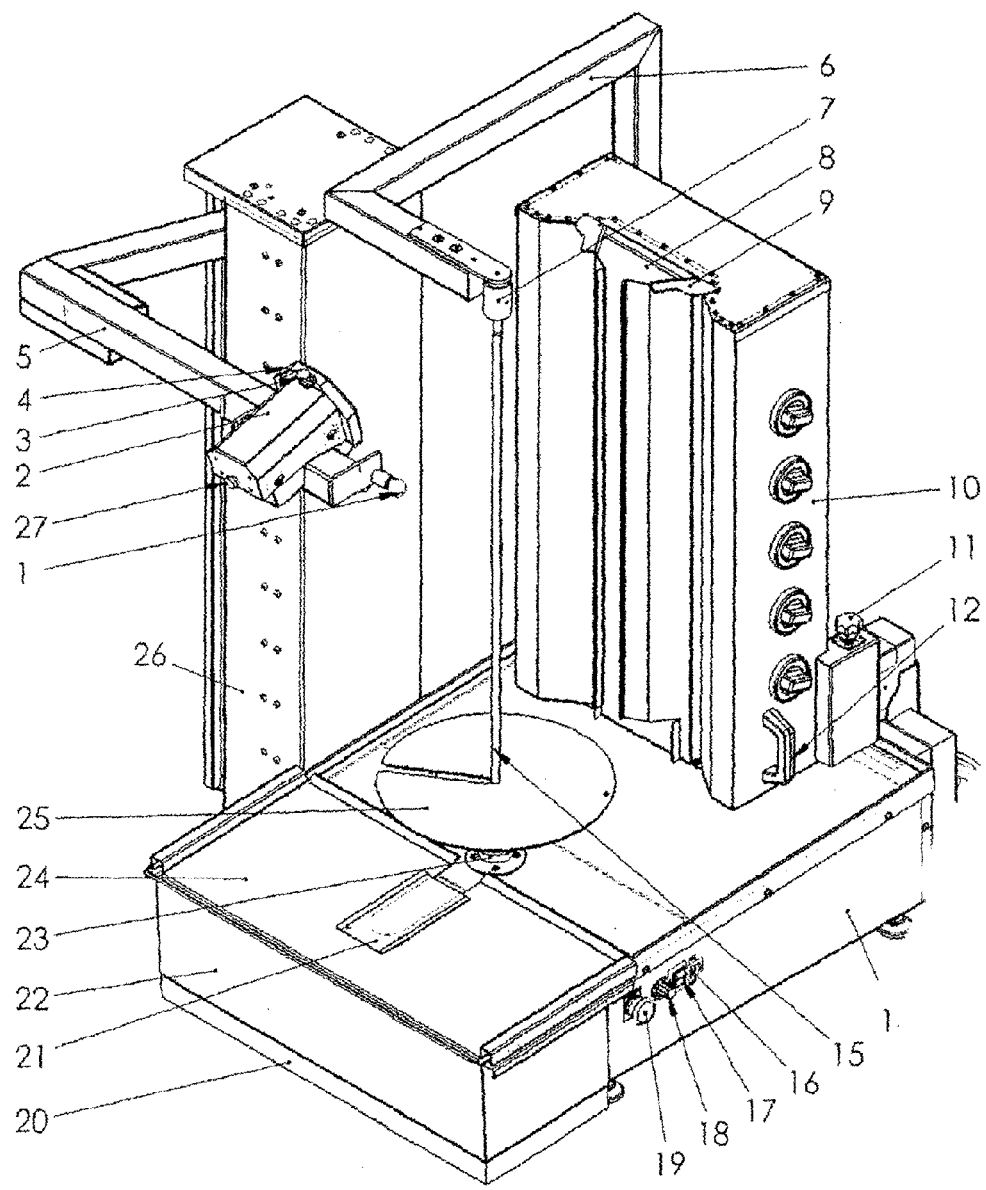
FIG. 1: The view of the automatic doner kebab slicing machine according to the present, invention in a completely mounted manner.
Figure 2:
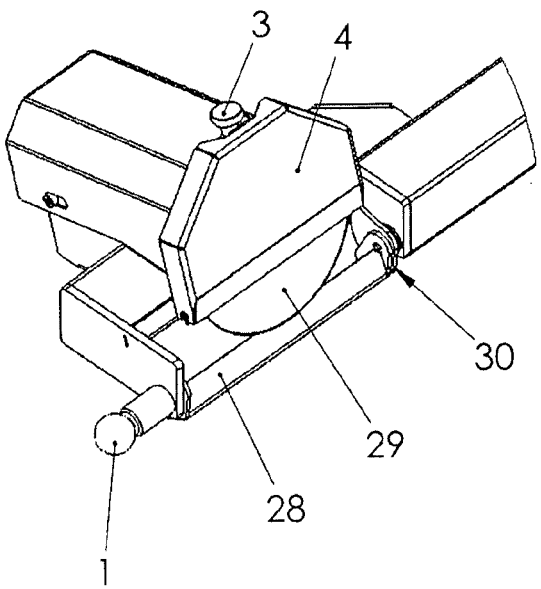
FIG. 2: The three-dimensional view of automatic doner kebab slicing machine according to the present invention.
Figure 3:
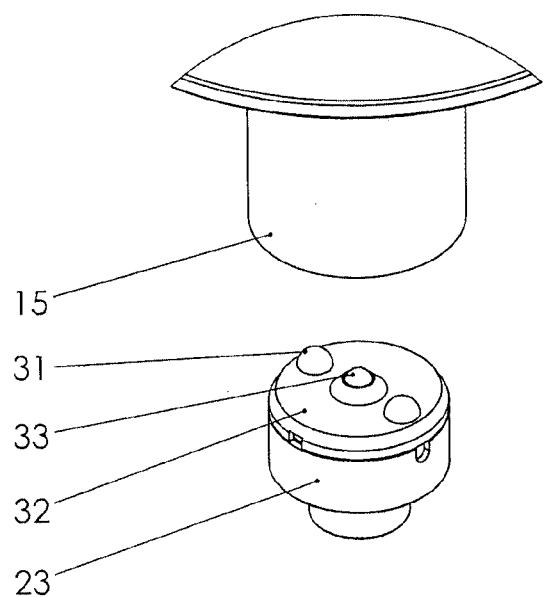
FIG. 3: The three-dimensional view of doner kebab rotisserie and bearing in automatic doner kebab slicing machine according to the present invention.
Figure 4:
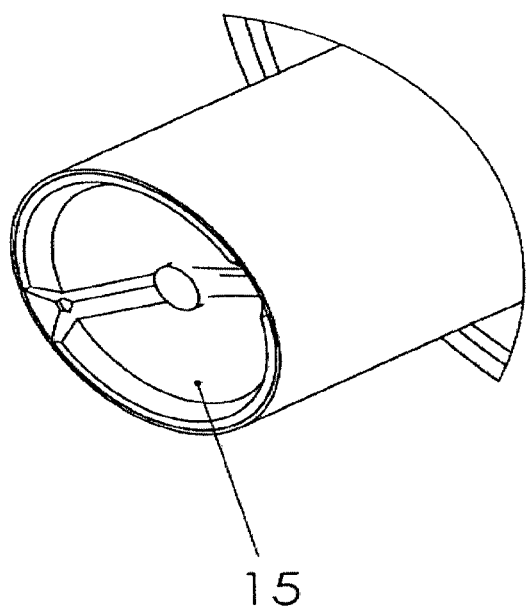
FIG. 4: The three-dimensional view of doner kebab rotisserie in automatic doner kebab slicing machine according to the present invention.

1. Doner kebab follow-up apparatus montage pin
2. Cutting unit
3. Knife front casing fixing member
4. Knife front casing
5. Arm unit
6. Doner kebab upper holder profile
7. Doner kebab shaft top fixer
8. Burner cleaning cover
9. Burner wing
10. Doner kebab burner
11. Doner kebab burner angle adjuster
12. Doner kebab burner motion arm
13. Power cable
14. Main body
15. Doner kebab rotisserie
16. Programming input
17. On/off button
18. Pressure adjustment button
19. Emergency button
20. Tray bottom burner
21. Tray doner kebab piece sheet
22. Doner kebab meat covering tray
23. Doner kebab rotisserie lower bearing
24. Doner kebab meat cover upper lid
25. Doner kebab bottom sheet
26. Vertical unit
27. Thickness adjustment screw
28. Doner kebab follow-up apparatus
29. Circular knife
30. Doner kebab follow-up apparatus bearing
31. Doner kebab rotisserie lower bearing ball
32. Doner kebab rotisserie lower bearing upper lid
33. Doner kebab rotisserie lower bearing middle ball

DETAILED DESCRIPTION OF THE INVENTION

In this detailed description, the preferred embodiments of automatic doner kebab slicing machine according to the present invention are described only for the object to be understood better, without any limiting effects.

In the invention, doner kebab rotisserie (15) generally attached through the middle of doner kebab and used for placing the doner kebab in the system is provided. Doner kebab rotisserie lower bearing (23), where required rotary motion is performed in order for said doner kebab rotisserie (15) to be stopped at desired position during the slicing process, is provided. Said doner kebab rotisserie lower bearing (23) is located into the housings inside the doner kebab rotisserie (15) so as to zeroize the gap by means of doner kebab rotisserie lower bearing balls (31) thereon. As said before, doner kebab rotisserie lower ball (31) fits into the grooves on the lower conic surface of doner kebab rotisserie (15) and enables the doner kebab rotisserie (15) and the bearing (23) rotating the rotisserie (15) to move with zero gap. The doner kebab rotisserie lower bearing upper lid (32) provided on doner kebab rotisserie lower bearing (23) and protects the doner kebab rotisserie lower bearing balls (31) by covering thereof, is rotated via a wrench in an angular manner with respect to the doner kebab rotisserie lower bearing (23) in case of electricity cut or any breakdown and thus, the doner kebab rotisserie lower bearing balls (31) are fitted into the gaps on the doner kebab rotisserie lower bearing (23), and doner kebab rotisserie (15) is rotated on the doner kebab rotisserie lower bearing middle ball (33) provided on the doner kebab rotisserie lower bearing upper lid (32); therefore, the doner kebab is made to rotate idly for manual slicing. As the amount of doner kebab formed on said doner kebab rotisserie (15) reduces, the angular speed required in order to perform the serial slicing is also decreased.

Said doner kebab rotisserie (15) is fixed from the top by means of doner kebab upper holder profile (6). In the invention, doner kebab shaft top fixer (7) is the bearing mechanism where vertically mobile doner kebab rotisserie. (15) used for attaching and removing the doner kebab rotisserie (15) rotates. In the large diameter doner kebabs, doner kebab bottom broad sheet (25) that prevents the doner kebab bottom from collapsing is provided.

The doner kebab meat mentioned in the invention is sliced via circular knife (29) that performs slicing by means of rotary motion. The meat is sliced thanks to the fact that the cutting end of the circular knife (29) performs relative motion with respect to the done kebab meat by means of rotating motion. Said circular knife (29) is positioned into the cutting unit (2). Said cutting unit (2) including motor therein is mobile and provides thickness adjustment. That the circular knife (29) is mobile enables to apply equal pressure on the meat even if the thickness adjustment is changed during the slicing process. The knife (29) mentioned in the present invention comprises knife front casing (4) that prevents the knife from spattering meat outside and eliminates the injury risk. Said knife front casing (4) is fixed by means of knife front casing fixing member (3). It enables the casing to be removed by being loosened.

The doner kebab meat is cooked by means of doner kebab burner (10), which is a heat source used for cooking the doner kebab. It has electrical and gas-filled types. Its power can be changed by multiplying the burner panels on vertical or horizontal axis. Its motion can be controlled automatically. The doner kebab burner (10) can be stopped at desired angle in accordance with doner kebab surface by means of doner kebab burner angle adjuster (11). Stopping said doner kebab burner (10) at desired angle in accordance with doner kebab surface is performed by means of doner kebab burner motion arm (12). In the invention, burner wings (9) which can rotate around a point that will enable the burner (10) heat source to focus on desired area, i.e. on doner kebab surface, and prevent the burner (10) front panel from becoming dirty by covering the entire surface thereof, can perform fixing on the location where it is released without requiring pressing, and are provided at both sides of the burner (10). Burner cleaning lid (8) that will prevent the radiants from being damaged by the cleaning material during the cleaning process of burner (10) is provided.

The doner kebab meat is sliced by means of doner kebab follow-up apparatus (28) that enables the doner kebab meat to be sliced at fixed thickness thanks to the fact that the position of the top thereof with respect to the circular knife (29) does not change when it performs rotating motion. Surface position of doner kebab is detected by means of rotating motion. Cleaning process is performed by removing thereof easily. The doner kebab follow-up apparatus bearing (30) is the member where doner kebab follow-up apparatus (28) is located and rotating motion is transferred to the motion detector. In addition, doner kebab follow-up apparatus montage pin (1) that is used in order for doner kebab follow-up apparatus (28) to be attached and removed during cleaning. Said pin (1) is spring and can return to its initial position when it is released. In the invention, pressure adjustment button (18) that determines how much pressure doner kebab follow-up apparatus (28) is required to apply on doner kebab surface is provided. Thickness adjustment screw (27) is used in order to adjust the thickness of meat to be sliced. Thickness adjustment is performed by increasing and decreasing distance of cutting unit (2) with respect to the fixed section of doner kebab follow-up apparatus (28). All the elements required for performing the vertical motion necessary in order to slice meat are included within the vertical unit (26). The cutting unit (2) and the mechanism detecting the position of doner kebab surface are comprised within the arm unit (5). Extension is provided towards the front section and said vertical unit (26) is enabled to function behind. Said situation enables the mobile mechanism to remain behind.

In the invention, doner kebab meat is positioned in the doner kebab meat covering tray (22). Therefore, doner kebab is covered. It is mowed away from the ground thanks to the perforated sheet therein. The oil and water are enabled to accumulate on the ground. It can be easily cleaned by being removed from the main body (14). Power/control unit, lateral motion system and rotating motion system are provided inside said main body (14). It is cooled by means of the fan/s comprising air filter at the front thereof. The doner kebab meat cover upper lid (24) is located onto the doner kebab meat covering tray (22) and prevents the doner kebab from being dried and cooling by being opened and closed thanks to the fact that it is made to move linearly in a back and forth manner. In addition, tray doner kebab piece sheet (21) that enables the doner kebab meat to be put into closed chamber without fully opening the upper lid, and is moved by being easily moved around the pin, is provided. The tray bottom burner (20) is the burner that enables the sliced doner kebab meat to remain at desired temperature and is located under the doner kebab meat covering tray (22).

Energy input is provided for the machine according to the present invention by means of power cable (13). The energy is given or taken off in the system by means of on/off button (17). Programming input (16) is the electrical input socket used for software update. In addition to these, emergency button (19) stopping the motion and cutting the energy in the system in case of emergency is provided in order for the system to function in a safer manner.

Functioning Principle of the Invention.

The doner kebab rotisserie (15) is attached through the middle of formed doner kebab, is located at the doner kebab rotisserie lower bearing (23) and is fixed with doner kebab shaft upper fixer (7) provided on the doner kebab holder upper profile (6). The doner kebab rotisserie (15) is located into the doner kebab rotisserie lower balls (31) on the doner kebab rotisserie lower bearing (23) so as not leave any gap thanks to the conical shape of the bottom of doner kebab rotisserie (15) and to the grooves formed on the conical surface. It rotates idly on said bearing (23) in case of pulsed placement and prevents possible hits. The doner kebab rotisserie (15) is rotated together with doner kebab thereon without being displaced by rotating the doner kebab rotisserie lower bearing upper lid (32) via a wrench angularly with respect to the doner kebab rotisserie lower bearing (23) in case of electricity cut or any breakdown, and the doner kebab rotisserie (15) is enabled to rotate idly on the doner kebab rotisserie lower bearing middle ball (33) for manual slicing.

If doner kebab diameter is large, doner kebab bottom broad sheet (25) is put under the doner kebab and doner kebab is prevented from leaning downwards. The angle of burner (10) is adjusted via angle adjuster (11) and the distance thereof is adjusted via motion arm (12) in accordance with doner kebab surface. Again, burner wings (9) are adjusted in accordance with the size of doner kebab and the heat is directed to the desired area.

The doner kebab follow-up apparatus (28) is located into the bearing (30) thereof by pulling the doner kebab follow-up apparatus montage pin (1). The circular knife (29) is located into the housing thereof and is fixed via fixing bolt (3) by closing the upper lid (4). The thickness adjustment of the knife is performed by means of rotating the thickness adjustment screw (27) and moving the knife (29) provided on the cutting unit (2).

The sliced doner kebabs are enabled to be stored and to remain hot and wet in the chamber thanks to the lid (24) closed on doner kebab meat covering tray (22). The sliced product can be accessed easily via upper lid (24) that is mobile in a back and forth manner and doner kebab piece sheet (21). The tray bottom burner (20) enables the sliced doner kebab meat to remain at desired temperature.

Upon issuing the command "slice", doner kebab follow-up apparatus (28) provided on arm unit (5) gets closer to the doner kebab. Surface follow-up apparatus (28) which is under the circular knife (29) changes its angle according to slope of the doner kebab surface followed-up by applying pressure to the doner kebab 'surface by means of the doner kebab follow-up apparatus bearing (30) and this angle change is transferred to doner kebab follow-up bearing (30). Surface follow-up is done by construing with electronic angle reader which is connected to doner kebab follow-up apparatus bearing (30). The apparatus (28) contacting with the meat surface performs angular motion without changing the distance between thereof and circular knife (29) rotating. Said motion is transferred to the detector thanks to the bearing (30) and read by the electronic system. Thus, the position of doner kebab is detected. The surface of doner kebab is followed up at the pressing force determined by the user via pressure adjustment button (18) and at the thickness again determined by the user, and is sliced by the rotating knife (29).

When the power cable (13) provided on the main body (14) is attached and on/off button (17) is switched on, the system becomes ready for operation. The emergency button (19) is used in order to stop the system and cut the energy in case of emergency. Programming input (16) is used for software update. During cleaning of doner kebab burner (10), cleaning lid (8) is located so as to cover the top of the cores and cleaning chemical materials are prevented from damaging the cores.

In the preferred embodiments of the present invention, the gas-filled burner on the present invention can be in double-row (V type) and three-row, apart from a single row. The same variety can also be applied to electrical burners. As the diameter of doner kebab becomes smaller, doner kebab burner (10) can be made to get closer to the doner kebab automatically.

In another preferred embodiment of the present invention, doner kebab surface is recognized by heat sensor or sensors and start command can be issued for the slicing process automatically.

The doner kebab rotisserie (15) can be rotated manually in case of any electricity cut or breakdown. The rotating motion of doner kebab can be determined by the user and the number of the balls (31) on the doner kebab rotisserie lower bearing can be changed.

The invention claimed is:

1. An automatic doner kebab slicing machine for formed meat, the automatic doner kebab slicing machine comprising:
    a doner kebab rotisserie upon which the formed meat is positioned;
    an arm unit having a cutting unit therein, the cutting unit having a circular knife therein;
    a motor located in said cutting unit and cooperative with said circular knife so as to rotate said circular knife in order to slice the formed meat;
    a doner kebab burner having a burner wing adapted to provide heat to the formed meat;
    a doner kebab follow-up apparatus positioned and under said circular knife so as to change an angle of said circular knife according to a slope of a surface of the formed meat by applying a pressure to the surface of the formed meat, said doner kebab follow-up apparatus positioned in at least one bearing, said doner kebab follow-up apparatus having an electronic angle reader connected to said at least one bearing so as to perform a follow-up process to the surface of the formed meat by transferring the change of angle to said at least one bearing and interpreting an angle motion with said electric angle reader, said at least one bearing of said doner kebab follow-up apparatus making contact with the formed meat by applying a force to the surface of the formed meat by the angular motion of said at least one bearing during the slicing of the form to meat so as to determine an actual doner kebab surface by applying pressure to irregular meat pieces hanging from the surface of the formed meat, said at least one bearing connecting the surface of the formed meat that is opposite to said circular knife; and
    a thickness adjustment screw adapted to adjust a thickness of the formed meat to be sliced by determining a position of said cutting unit with respect to said doner kebab follow-up apparatus.

2. The automatic doner kebab slicing machine of claim 1, said doner kebab rotisserie having a lower bearing so as to allow said doner kebab rotisserie to be rotated idly, said lower bearing enabling the surface of slice of the formed meat to be positioned adjacent to an end of a vertical movement of said circular knife.

3. The automatic doner kebab slicing machine of claim 1, further comprising:
    pressure adjustment button cooperative with said doner kebab follow-up apparatus so as to adjust the pressure applied to the surface of the formed meat.

4. The automatic doner kebab slicing machine of claim 1, further comprising:
    a doner kebab meat covering tray adapted to receive the formed meat therein; and
    a tray bottom burner positioned under said doner kebab meat covering tray so as to apply a desired amount of heat to the formed meat in said doner kebab meat covering tray.

* * * * *